(12) United States Patent
Riedle

(10) Patent No.: US 6,611,827 B1
(45) Date of Patent: Aug. 26, 2003

(54) REDUNDANT DISK ARRAY AND METHOD FOR REDUNDANT DISK ARRAY ACCESS USING CONTIGUOUS PAGE GROUPING

(75) Inventor: Linda Ann Riedle, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/411,810

(22) Filed: Oct. 1, 1999

(51) Int. Cl.[7] .......................... G06F 17/30; G06F 12/00
(52) U.S. Cl. ................... 707/1; 711/114; 711/200; 711/112
(58) Field of Search ............... 707/1–2, 200–206; 711/1–4, 110–114

(56) References Cited

U.S. PATENT DOCUMENTS

| | | | |
|---|---|---|---|
| 5,408,644 A | 4/1995 | Schneider et al. | |
| 5,537,534 A | 7/1996 | Voigt et al. | |
| 5,542,065 A | 7/1996 | Burkes et al. | |
| 5,613,085 A | * 3/1997 | Lee et al. | 711/114 |

* cited by examiner

*Primary Examiner*—Alford Kindred
(74) *Attorney, Agent, or Firm*—Bracewell&Patterson LLP

(57) ABSTRACT

A redundant disk array and improved method for redundant disk array access improve the performance of storage systems for computers. The disk array and method retrieve data from redundant drives according to an algorithm that will fetch contiguous pages from a single storage device, rather than alternating accesses between storage devices. The result is a reduced access time and increased data throughput.

12 Claims, 3 Drawing Sheets

REDUNDANT DISK ARRAY AND METHOD FOR REDUNDANT DISK ARRAY ACCESS USING CONTIGUOUS PAGE GROUPING

BACKGROUND OF THE INVENTION

1. Field of the Invention

The present invention relates in general to improved data storage systems and in particular to an improved method and system for reading stored data from a data storage system. Still more particularly, the present invention relates to an improved method and system for fetching stored data from multiple disks that takes advantage of contiguous groups of data organized on the disks.

2. Description of Related Art

As the performance of microprocessor and semiconductor memory technology increases, there is a need for improved data storage systems with comparable performance enhancements. Additionally, in enhancing the performance of data storage systems, there is a need for improved reliability of data stored. In 1988, a paper was published by Patterson, Gibson, Katz, A Case for Redundant Arrays of Inexpensive Disks (RAID), International Conference on Management of Data, pgs. 109–116, June 1988. This paper laid the foundation for the use of redundant arrays of inexpensive disks that would not only improve the data transfer rate and data I/O rate over a comparable single disk access, but would also provide error correction at a lower cost in data storage systems.

Storage systems for computers require fast access and high reliability. A RAID provides a low cost means for both reducing access times and increasing reliability of data. A set of disks is grouped together in an array and pages of data written to the array are "striped" or written across each of the disks.

Striping consists of writing a sequential data block in pages of equal size, and sequential pages are written to alternate drives, in a round-robin fashion. For example, if a RAID has three disks, three pages will be striped across the first stripe, then the fourth page will start the second stripe, starting again with the first disk. This is known as RAID 0, and does not provide increased reliability through redundancy, but reduces access times by a factor approaching the number of drives in the array. RAID 1 (sometimes called RAID Level 1) is a technique providing "mirroring" of data, which increases reliability and reduces access time by increasing availability. In mirroring, pages are written to more than one drive, which makes recovery from data failures possible and also increases the likelihood that the data will be available when requested (as opposed to having to wait for the drive containing the data to be available).

In RAID 1, mirroring and striping are combined. The mirrored data, comprising the second set of pages, are striped on alternate stripes from the primary data. The alternate pages are also shifted one drive in the sequence from the corresponding primary page, so that the alternate page and the mirrored page will never be on the same drive.

The data is typically read from the disks by alternating reads between the drives. This provides faster access to the data on the disk, since the second disk will be available to accept a command to read while the first disk is still busy executing the first read command.

RAID includes an array of disks that are typically accessed by a host, such as a computer system, as a unified storage device. These disks may be magnetic disks, optical disks or other storage devices designed to provide long term storage for data. A RAID controller may be a hardware and/or software tool for providing an interface between the host and the array of disks. Preferably, the RAID controller manages the array of disks for storage and retrieval and can access the disks of the RAID separately. The disks included in the array may be any type of data storage systems which can be controlled by the RAID controller when grouped in the array.

The RAID controller is typically configured to access the array of disks as defined by a particular "RAID level." The RAID level specifies how the data is distributed across the disk drives and how error correction is accomplished. In the paper noted above, the authors describe five RAID levels (RAID Level 1–RAID level 5). Since the publication of the paper, additional RAID levels have been designated.

RAID levels are typically distinguished by the benefits included. Three key benefits which may be included in a RAID level are fault tolerance, data availability and high performance. Fault tolerance is typically achieved through an error correction method that ensures that information can be reconstructed in the event of a disk failure. Data availability allows the data array to continue to operate with a failed component. Typically, data availability is achieved through a method of redundancy. Finally, high performance is typically achieved by simultaneous access to multiple disk drives which results in faster I/O and data transfer requests.

Error correction is implemented in some RAID levels by utilizing additional parity data stored with the original data. Parity data may be utilized to recover lost data due to disk failure. Parity data is typically stored on one or more disks dedicated for error correction only, or distributed over all of the disks within an array.

In a redundant storage scheme, data is stored in multiple disks of the array. Redundancy is a benefit in that redundant data allows the storage system to continue to operate with a failed component while data is being replaced through the error correction method. Additionally, redundant data is more beneficial than stored long-term back-up data because back-up data is typically outdated when needed whereas redundant data is current when needed.

Disk arrays are preferably configured to include logical drives which divide the physical drives in the disk array into logical components which may be viewed by the host as separate drives. Each logical drive includes a cross section of each of the physical drives and is assigned a RAID level. For example, a RAID system may include 10 physical drives in the array, and those 10 drives may contain 20 logical drives.

A host computer requests data from the data storage system. The storage system typically contains a cache, where data that has been recently read from the disk, and sometimes prefetched data is contained. Prefetch data is data that is determined to be likely needed based on prior read requests. In a prefetch system, data that has not been specifically requested, but is calculated to likely be requested is read into a cache. Typically, data requests are divided into read commands where each read command may request a fixed amount of data. Often, read commands request sequential data through a series of read requests from the host computer for sequential portions of the data. Under standard operation, upon receiving a read command, the RAID controller will check its cache for the requested data. If the requested data is available in the cache, a cache hit is issued and the data is supplied to the host computer from the cache. However, if the requested data is not available in the cache, there is a cache miss and a read command is issued to the physical drive to retrieve the requested data into the cache. The command may be a Small Computer System Interface (SCSI) command, for example or other appropriate command for the particular drive interface type.

It would therefore be desirable to devise a method that will improve the performance of storage device arrays. It would further be desirable to devise a computer program product wherein such a method may be performed on a computer system. In addition, it would be desirable to devise a redundant storage device array with improved performance.

SUMMARY OF THE INVENTION

It is therefore one object of the present invention to provide an improved data storage device for a computer system.

It is another one object of the present invention to provide a method to improve the access and throughput of a redundant array of direct access storage devices.

It is still another object of the present invention to provide a redundant direct access storage device array with improved access and throughput.

The foregoing objects are achieved in a method for accessing pages in a redundant direct access storage array, wherein access to pages in a multi-page request are grouped into single commands for each contiguous grouping of pages on each drive. The grouping of pages in a request may be performed by examining existing commands to determine if a page is available contiguous with pages that have already been added to an existing command and extending that command if the page is available contiguous, or creating a new command if it is not. A device implementing the invention may be embodied in a control means contained within a RAID 1 storage array. The invention may also be embodied in a computer program product having machine-readable instructions for carrying out the above method.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like parts throughout, and:

DESCRIPTION OF THE ILLUSTRATIVE EMBODIMENTS

Figures 1, 4:
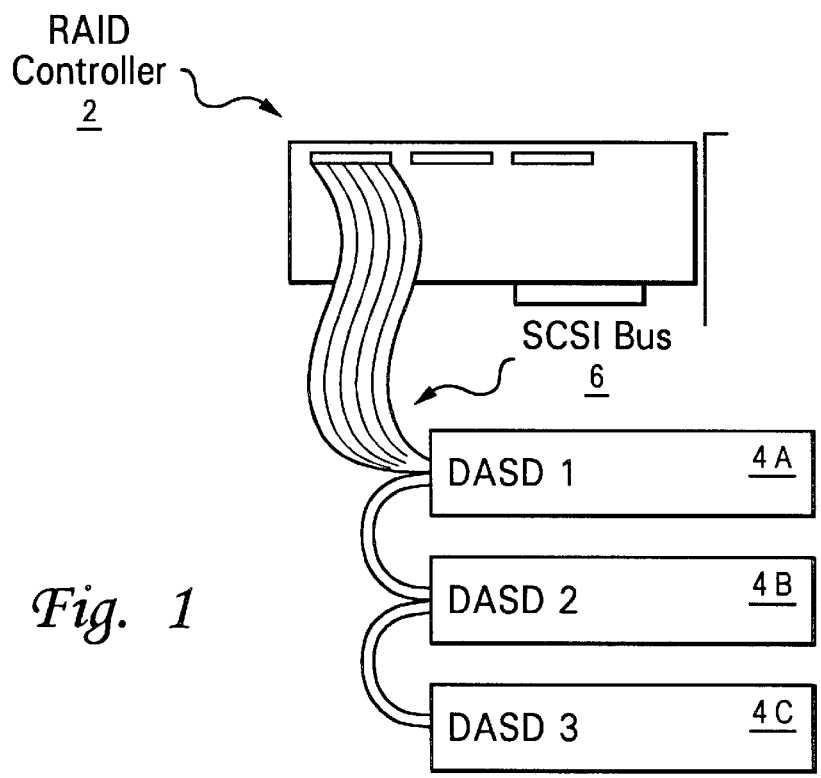
FIG. 1 is an illustration of components in a data storage subsystem in which the present invention may be practiced.
FIG. 4 is an illustration depicting data arrangement in a RAID disk storage system in accordance with one embodiment of the present invention.

With reference now to the figures and in particular with reference to FIG. 1, the components of a RAID array in accordance with one embodiment of the present invention is shown. RAID controller 2, generally configured as a plug-in card for a computer bus, for example a PCI (Personal Computer Interconnect) bus provides an interface from a computer system to a series of direct access storage devices (DASDs) 4A, 4B, and 4C. DASD 4 are shown as being coupled to RAID Controller 2 via SCSI Bus 6, but may be connected via some other bus architecture such as IDE (Integrated Device Electronics) or "Firewire" (IEEE 1394).

Figure 2:
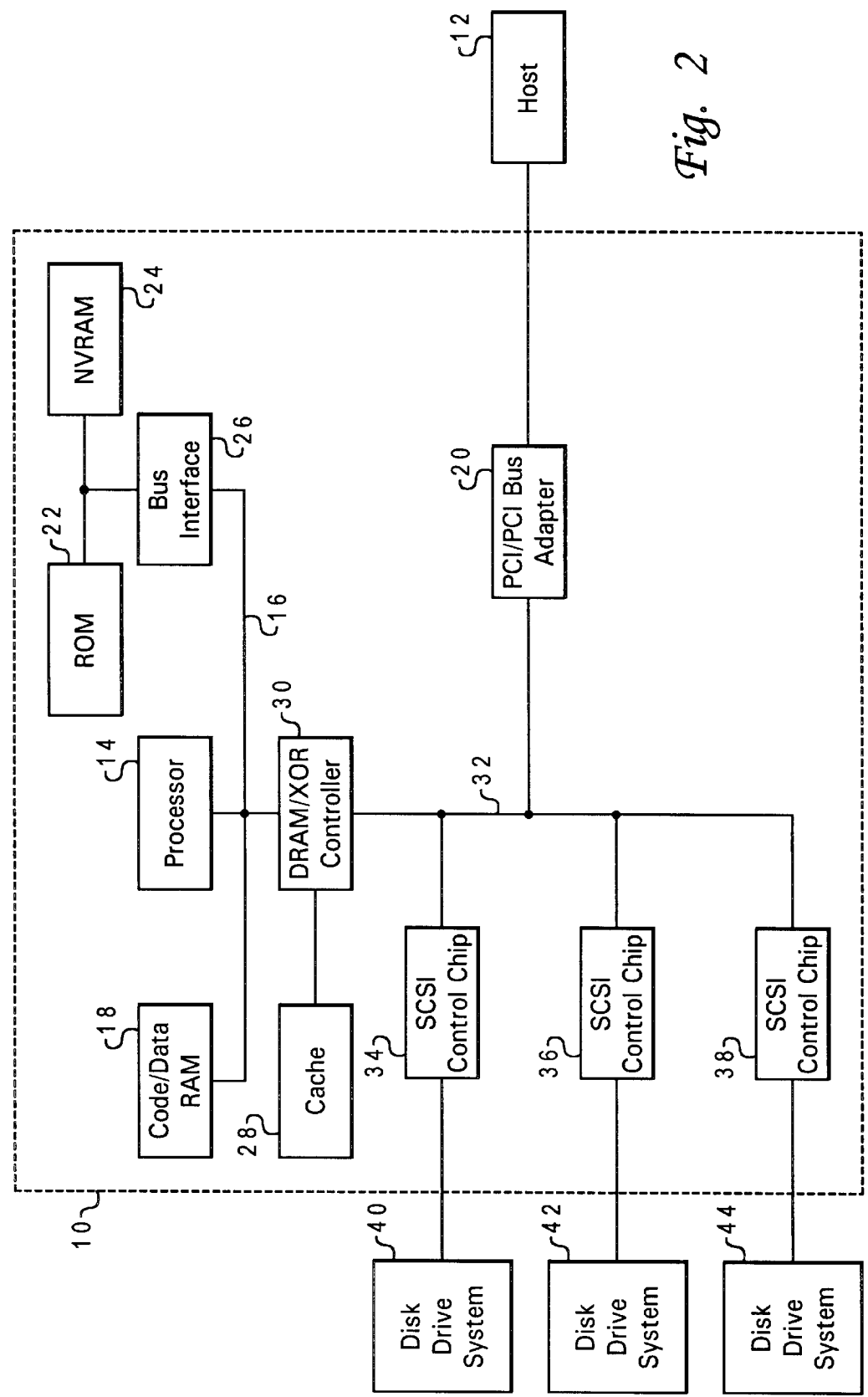
FIG. 2 is a block diagram of a data storage system in which the present invention may be practiced.

FIG. 2 depicts a high level block diagram of a RAID data storage system which may be utilized to implement the present invention. RAID data storage system 10 is coupled to host processor 12 via PCI/PCI bus adapter 20. Data storage system 10 and host processor 12 may be incorporated in a single hardware unit, such as a general purpose data processing system. Alternatively, data storage system 10 may be incorporated into one hardware unit and host processor 12 may be incorporated into another hardware unit, such as the data processing system.

Host processor 12 may be implemented in a variety of data processing systems under a number of different operating systems. The data processing systems may be, for example, a personal computer, a mini-computer, or a mainframe computer. The data processing systems may be a stand-alone system or part of a network such as a local area network (LAN) or a wide area network (WAN).

As illustrated, processor 14 is utilized to control data storage system 10 which is preferably a RAID data storage system. Processor 14 is preferably an advanced microprocessor which is coupled to processor bus 16. As depicted, also coupled to processor bus 16 is code/data Random Access Memory (RAM) 18 which is utilized to temporarily store code and data utilized by processor 14. Processor 14 interacts with RAM 18 to read and execute read commands from host processor 12 stored in RAM. Read-Only Memory (ROM) 22 and non-volatile random access memory (NVRAM) 24 are typically accessed using an 8 bit bus and thus bus interface0 26 is used to interface those devices to processor bus 16, which is typically a 32 bit bus.

Operational code is stored within ROM 22, which, as those skilled in the art will appreciate, is generally provided by so-called "flash" ROM. Operational code is then fetched from ROM 22 by processor 14 upon initialization to direct the operation of processor 14 to perform functions including the functions of the present invention. NVRAM 24 is a low power CMOS memory which is powered up for "back-up" by a battery such that the information stored in NVRAM 24 will not be lost when main power is terminated. Thus, NVRAM 24 may be utilized to store configuration data or operational code in a manner similar to that stored within ROM 22. The system configuration is generally read from ROM 22 at initial power application and any changes to system configuration during operation are stored within NVRAM 24 and then entered into a "device change list" which is also stored within NVRAM 24 and on each disk drive within the system.

A cache 28 is also provided which is coupled to DRAM/XOR controller 30. Cache 28 may be configured into multiple temporary storage positions where each temporary storage position may be referred to as a page of cache 28. DRAM/XOR controller 30 is utilized to control access to random access memory 18 and also provides a hardware implemented exclusive or (XOR) circuit which may be utilized to rapidly and efficiently calculate parity for changes in updated data.

DRAM/XOR controller 30 is coupled to local bus 32. Also coupled to local bus 32 are multiple small computer system interface (SCSI) control chips 34, 36 and 38. Each SCSI control chip 34, 36 and 38 is defined as including channels which may each support a disk drive storage system comprising multiple disks. Those having ordinary skill in this art will appreciate that alternative bus architectures may be utilized to implement the data storage system; however, the depicted embodiment of the present invention utilizes multiple disk drive data storage systems 40, 42 and 44 which are configured in the SCSI bus architecture.

The drives connected to the (SCSI) or other control chips for other types of drives, can generally accept commands comprising an operation code, a starting point, and a number of data sets to read. By organizing pages, the lowest unit of data in the RAID striping sequence, as contiguous groups of sectors, the system may use these commands to read groups of pages, as long as the pages are contiguous. This grouping may also occur at a higher level and the practice of the present invention is not limited to grouping data that is physically contiguous on the drive, only data that is logically contiguous at some level in the storage system.

The meaning of contiguous in the context of the invention, is that device commands can be incrementally modified to encompass that data by changing a read size parameter. Physical disk drives may be interleaved, or data may be arranged by some other scheme, wherein the physical pages are not contiguous, but the logical access to those pages is contiguous with respect to the read command. Interleaving is a technique wherein the logical pages on a device are assigned to physical pages that are separated by a specific interval. Commands on interfaces such as SCSI or Integrated Device Electronics (IDE) can typically read a number of logical pages in response to one command. The command contains a starting page and a number controlling the number of pages read.

Figure 3:
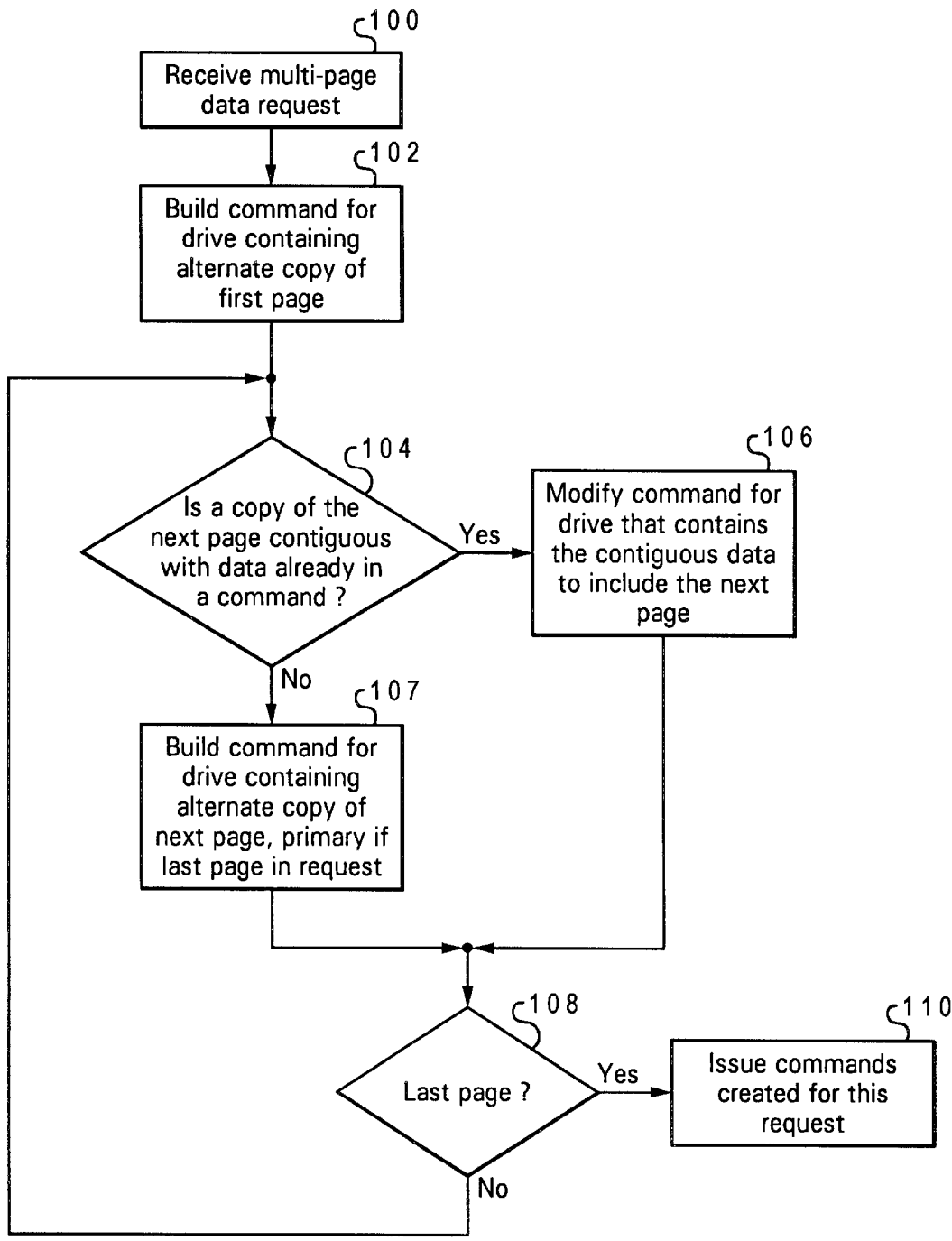
FIG. 3 is a flow diagram which illustrates an embodiment of the method of the present invention.

Referring now to FIG. 3, an embodiment of the method of the present invention is depicted in flow diagram form. Data Storage System 10 receives a request for a plurality of pages from Host 12 (Step 100). A command is built using the alternate copy of the first page in the request (Step 102). If either the alternate or primary copy of the next page in the request is contiguous with the first page (Decision 104), then the command is modified to include that copy of the page (Step 106), if not, a new command is built to read the page from the drive that contains the alternate copy of the page, unless it is the last page in the request, in which case the primary copy of the page is chosen (Step 107). This process continues, with either new commands being built or commands extended to encompass pages contiguous to pages already requested until the last page in the request is reached (Step 108), then the commands are issued to read all the pages in the request (Step 110).

Referring now to FIG. 4, the organization of data within a RAID 1 array is shown, with groupings to illustrate the operation of an embodiment of the present invention, for an exemplary request for a multiple-page data read. Symbols A–I correspond to the primary copy of the pages within the RAID, and symbols A'–I' correspond to the alternate copies.

The groupings shown correspond to the results for a request to read pages A–H in order. Since A is the first page in the request, the alternate copy will be read, which is on DASD 2. The next page B is available contiguously on DASD 2, so the command to read page A' will be extended to read page B. C or C' are not available contiguously with pages that are already read by a command, so a new command to DASD 1 will be built to read alternate copy C'. Next, D is available contiguous with C' on DASD 1, so the new command is extended. Then, E is available contiguous with A' on DASD 2 which is to be read in the first command, therefore the first command is extended to encompass E. F' and G are added to the first command by operation of the same steps and finally H or H' are not available as contiguous data to any command, so a new command for DASD 2 is built to read primary page H instead of alternate page H', since it is the last page in the request. Reference 64 shows the grouping of pages for the second command, 62 the grouping for the first command, and 66 the solitary H read command.

Because the method of the invention builds commands while examining all the pages requested for a given transfer to the host, an efficient organization of drive accesses is achieved. This is a significant improvement over prior art systems that either read only the primary pages, or only the alternate pages, or simply alternated between the primary and alternate pages.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, although the invention has been described with respect to a data storage system executing software that directs the method of the present invention, it should be understood that the present invention may be embodied in a computer program product for use with a data storage computer or other computer system . It is therefore contemplated that such modifications can be made without departing from the spirit or scope of the present invention as defined in the appended claims.

What is claimed is:

1. A method for accessing data in a plurality of storage devices configured as a redundant array of inexpensive disks (RAID), said method comprising:

in response to a retrieval request for a plurality of pages stored within said plurality of storage devices, constructing a first command to retrieve an alternative copy of a first page of said plurality of pages;

determining whether a second page of said plurality of pages or an alternative copy of said second page is contiguous with said alternative copy of said first page within one of said storage devices;

in a determination that said second page or said alternative copy of said second page is contiguous with said alternative copy of said first page within one of said storage devices, modifying said first command to retrieve said alternative copy of said first page and said second page or said alternative copy of said second page; and retrieving said alternative copy of said first page and said second page or said alternative copy of said second page by sending first command to access said one of said storage devices.

2. The method of claim 1, further comprising in a determination that said second page or said alternative copy of said second page is not contiguous with said alternative copy of said first page within said one of said storage devices, constructing a second command to retrieve said alternative copy of said second page;

retrieving said alternative copy of said first page by sending said first command to access said one of said storage devices; and retrieving said alternative copy of said second page by sending said second command to access a different one of said storage devices.

3. The method of claim 2, wherein said constructing a second command further comprises constructing said second command to retrieve said second page if said second page is a last page of said retrieval request.

4. The method of claim 1, wherein said plurality of storage devices is configured as a RAID 1 array.

5. A computer program product for accessing data in a plurality of storage devices configured as a redundant array of inexpensive disks (RAID), said computer program product comprising:

program code means for constructing a first command to retrieve an alternative copy of a first page of said plurality of pages, in response to a retrieval request for a plurality of pages stored within said plurality of storage devices;

program code means determining whether a second page of said plurality of pages or an alternative copy of said second page is contiguous with said alternative copy of said first page within one of said storage devices;

in a determination that said second page or said alternative copy of said second page is contiguous with said alternative copy of said first page within one of said storage devices, program code means for modifying said first command to retrieve said alternative copy of said first page and said second page or said alternative copy of said second page; and program code means for retrieving said alternative copy of said first page and said second page or said alternative copy of said second page by sending first command to access said one of said storage devices.

6. The computer program product of claim 5, further comprising in a determination that said second page or said alternative copy of said second page is not contiguous with said alternative copy of said first page within said one of said storage devices, program code means for constructing a second command to retrieve said alternative copy of said second page;

program code means for retrieving said alternative copy of said first page by sending said first command to access said one of said storage devices; and program code means for retrieving said alternative copy of said second page by sending said second command to access a different one of said storage devices.

7. The computer program product of claim 6, wherein said program code means for constructing a second command further comprises program code means for constructing said second command to retrieve said second page if said second page is a last page of said retrieval request.

8. The computer program product of claim 5, wherein said plurality of storage devices is configured as a RAID 1 array.

9. A plurality of storage devices configured as a redundant array of inexpensive disks (RAID), said plurality of storage devices comprising:

in response to a retrieval request for a plurality of pages stored within said plurality of storage devices, means for constructing a first command to retrieve an alternative copy of a first page of said plurality of pages;

means for determining whether a second page of said plurality of pages or an alternative copy of said second page is contiguous with said alternative copy of said first page within one of said storage devices;

in a determination that said second page or said alternative copy of said second page is contiguous with said alternative copy of said first page within one of said storage devices, means for modifying said first command to retrieve said alternative copy of said first page and said second page or said alternative copy of said second page; and means for retrieving said alternative copy of said first page and said second page or said alternative copy of said second page by sending first command to access said one of said storage devices.

10. The plurality of storage devices of claim 9, further comprising in a determination that said second page or said alternative copy of said second page is not contiguous with said alternative copy of said first page within said one of said storage devices, means for constructing a second command to retrieve said alternative copy of said second page;

means for retrieving said alternative copy of said first page by sending said first command to access said one of said storage devices; and means for retrieving said alternative copy of said second page by sending said second command to access a different one of said storage devices.

11. The plurality of storage devices of claim 10, wherein said means for constructing a second command further comprises means for constructing said second command to retrieve said second page if said second page is a last page of said retrieval request.

12. The plurality of storage devices of claim 9, wherein said plurality of storage devices is configured as a RAID 1 array.

* * * * *